US009778832B2

(12) United States Patent
Yang et al.

(10) Patent No.: US 9,778,832 B2
(45) Date of Patent: Oct. 3, 2017

(54) ELECTRONIC DEVICE HAVING TOUCH SCREEN AND FUNCTION CONTROLLING METHOD OF THE SAME (71) Applicant: SAMSUNG ELECTRONICS CO., LTD., Suwon-si (KR)

(72) Inventors: Hui Chul Yang, Seoul (KR); Nho Kyung Hong, Seoul (KR); Jin Young Jeon, Seoul (KR); Tae Young Kang, Uijeongbu-si (KR); In Won Jong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/189,497

(22) Filed: Jun. 22, 2016

(65) Prior Publication Data
US 2016/0299668 A1 Oct. 13, 2016

Related U.S. Application Data (63) Continuation of application No. 14/052,263, filed on Oct. 11, 2013, now Pat. No. 9,411,502, which is a (Continued)

(30) Foreign Application Priority Data

Dec. 20, 2007 (KR) ........................ 10-2007-0133866

(51) Int. Cl.
*G06F 3/0484* (2013.01)
*G06F 3/0488* (2013.01)
(Continued)

(52) U.S. Cl.
CPC ........ *G06F 3/04845* (2013.01); *G06F 3/0488* (2013.01); *G06T 11/001* (2013.01); *H04N 5/23293* (2013.01); *G06T 2200/24* (2013.01)

(58) Field of Classification Search
CPC .. G06F 3/0484; G06F 3/0488; G06F 3/04847; H04N 5/232
(Continued)

(56) References Cited

U.S. PATENT DOCUMENTS 5,270,806 A 12/1993 Venable et al.
5,559,301 A 9/1996 Bryan et al.
(Continued)

FOREIGN PATENT DOCUMENTS

JP 07-200126 A 8/1995
JP 2007-200126 A 8/2007
(Continued)

OTHER PUBLICATIONS

International Search Report dated Dec. 26, 2008 in PCT/KR2008/005760.
(Continued)

*Primary Examiner* — Carolyn R Edwards
(74) *Attorney, Agent, or Firm* — Sughrue Mion, PLLC (57) ABSTRACT A method for providing a graphical user interface on a display of a device includes: displaying a photograph image on the display of the device; receiving a touch input made on the display; superimposedly displaying a plurality of control guides at a location corresponding to the touch input over the displayed photograph image in response to the touch input; receiving a drag input corresponding to one of the plurality of control guides displayed on the display; adjusting a display characteristic of the photograph image corresponding to the one of the plurality of control guides, in response to the drag input; and displaying the photograph image having the adjusted display characteristic on the display, wherein the display characteristic is a magnification of the photograph image.

30 Claims, 6 Drawing Sheets

Related U.S. Application Data continuation of application No. 12/335,772, filed on Dec. 16, 2008, now Pat. No. 8,558,801.

(51) Int. Cl.
*G06T 11/00* (2006.01)
*H04N 5/232* (2006.01)

(58) Field of Classification Search
USPC .............................................. 345/156–184
See application file for complete search history.

(56) References Cited

U.S. PATENT DOCUMENTS

| | | | |
|---|---|---|---|
| 5,745,116 | A | 4/1998 | Pisutha-Arnond |
| 5,861,871 | A | 1/1999 | Venable |
| 6,094,197 | A | 7/2000 | Buxton et al. |
| 6,310,648 | B1 | 10/2001 | Miller et al. |
| 6,919,927 | B1 | 7/2005 | Hyodo |
| 7,212,234 | B2 | 5/2007 | Sakaguchi et al. |
| 7,522,195 | B2 | 4/2009 | Yanamoto et al. |
| 7,561,201 | B2 | 7/2009 | Hong |
| 7,593,603 | B1 | 9/2009 | Wilensky |
| 7,646,400 | B2 | 1/2010 | Liow et al. |
| 7,777,747 | B1 | 8/2010 | Krenz |
| 7,782,384 | B2 | 8/2010 | Kelly |
| 7,853,134 | B2 | 12/2010 | Imamura |
| 7,954,067 | B2 | 5/2011 | Breglio |
| 8,212,780 | B2 | 7/2012 | Mashimo |
| 2001/0052937 | A1 | 12/2001 | Suzuki |
| 2002/0015064 | A1 | 2/2002 | Robotham et al. |
| 2005/0190264 | A1 | 9/2005 | Neal |
| 2005/0193351 | A1 | 9/2005 | Huoviala |
| 2006/0066628 | A1 | 3/2006 | Brodie |
| 2006/0072028 | A1 | 4/2006 | Hong |
| 2006/0077185 | A1* | 4/2006 | Mashimo ............... A63F 13/06 345/173 |
| 2006/0098112 | A1 | 5/2006 | Kelly |
| 2006/0161871 | A1* | 7/2006 | Hotelling ............. G06F 3/0485 715/863 |
| 2006/0197753 | A1 | 9/2006 | Hotelling |
| 2007/0008300 | A1 | 1/2007 | Yang et al. |
| 2007/0035616 | A1 | 2/2007 | Lee et al. |
| 2007/0150826 | A1 | 6/2007 | Anzures et al. |
| 2007/0172155 | A1 | 7/2007 | Guckenberger |
| 2007/0183765 | A1* | 8/2007 | Imamura ................ G03B 5/02 396/55 |
| 2007/0186181 | A1 | 8/2007 | Bok et al. |
| 2007/0188628 | A1 | 8/2007 | Yamamoto et al. |
| 2007/0195174 | A1 | 8/2007 | Oren |
| 2007/0291338 | A1 | 12/2007 | Williams et al. |
| 2008/0052627 | A1 | 2/2008 | Oguchi |
| 2008/0074399 | A1 | 3/2008 | Lee |
| 2008/0119235 | A1* | 5/2008 | Nielsen ................. G06F 3/0483 455/566 |
| 2008/0129759 | A1 | 6/2008 | Jeon et al. |
| 2008/0130992 | A1 | 6/2008 | Fuji |
| 2008/0226199 | A1* | 9/2008 | Breglio ............... G06F 3/04847 382/311 |
| 2008/0252753 | A1 | 10/2008 | Ejima et al. |
| 2009/0027652 | A1 | 1/2009 | Chang |
| 2009/0037605 | A1 | 2/2009 | Li |
| 2009/0046075 | A1 | 2/2009 | Kim et al. |
| 2009/0153288 | A1 | 6/2009 | Hope et al. |
| 2009/0256947 | A1 | 10/2009 | Ciurea et al. |
| 2009/0265664 | A1 | 10/2009 | Shin |
| 2010/0130250 | A1 | 5/2010 | Choi |
| 2010/0220220 | A1 | 9/2010 | Park et al. |
| 2010/0284675 | A1 | 11/2010 | Machida et al. |
| 2011/0085784 | A1 | 4/2011 | Imamura |

FOREIGN PATENT DOCUMENTS

| | | |
|---|---|---|
| KR | 1020050042852 A | 5/2005 |
| KR | 1020060019362 A | 3/2006 |
| KR | 10-2006-0029353 A | 4/2006 |
| KR | 10-2007-0040107 A | 4/2007 |
| KR | 10-2007-0067297 A | 6/2007 |
| KR | 10-2007-0080917 A | 8/2007 |
| KR | 10-0774927 A | 11/2007 |

OTHER PUBLICATIONS

Communication dated Oct. 30, 2014 issued by the Korean Intellectual Property Office in counterpart Korean Patent Application No. 10-2014-0095988.

Communication dated Mar. 2, 2016, issued by the Korean Intellectual Property Office in counterpart Korean Application No. 10-2014-013761.

Communication dated Oct. 4, 2016 issued by the Korean Intellectual Property Office in Korean Patent Application No. 10-2016-0118396.

"https://youtu.be/Xcpqjssx9Bg", Online video clip, YouTube, Nov. 18, 2007.

"https://youtu.be/fu5_6nbY0Uo", Online video clip, YouTube, Jul. 17, 2008.

"https://youtu.be/xWy5HsT4qYA", Online video clip, YouTube, Nov. 14, 2006.

Sony Corporation, "Digital Still Camera Cyber-shot Handbook DSC-N2", 2-887-201-11(1), 2006, 132 pages.

Sony Corporation, "Digital Still Camera Cyber-shot Handbook DSC-T70/T75/T200", 3-219-480-12(1), 2007, 131 pages.

\* cited by examiner

ELECTRONIC DEVICE HAVING TOUCH SCREEN AND FUNCTION CONTROLLING METHOD OF THE SAME

CROSS REFERENCE TO RELATED APPLICATIONS

This is a continuation application of U.S. patent application Ser. No. 14/052,263, filed on Oct. 11, 2013, in the U.S. Patent and Trademark Office, which is a continuation application of U.S. patent application Ser. No. 12/335,772, filed on Dec. 16, 2008, in the U.S. Patent and Trademark Office, now U.S. Pat. No. 8,558,801, issued on Oct. 15, 2013, which claims priority from Korean Patent Application No. 10-2007-0133866, filed on Dec. 20, 2007, in the Korean Intellectual Property Office, the disclosures of which are incorporated herein by reference in their entireties.

BACKGROUND OF THE INVENTION

1. Field of the Invention

The present invention relates generally to a mobile terminal and, more particularly, to a method of controlling a function of a mobile terminal, which has a touch screen to provide an interaction guide thereon.

2. Discussion of the Background

Advances in information and communication technologies have enabled a mobile terminal to perform multi-functions. For example, in addition to call processing, an advanced mobile terminal may support various supplementary functions such as a camera function, Digital Multimedia Broadcasting (DMB), and a Bluetooth® function.

The mobile terminal may include an input unit, such as a keypad, to input control commands to control a variety of functions, however, it may be inconvenient for a user to manipulate the keypad with his/her finger because the keypad may be relatively small compared to his/her finger. Therefore, a mobile terminal may be provided with a touch screen instead of a keypad. However, a user using the mobile terminal having a touch screen may have difficulty in controlling various functions if the user is not familiar with processes of performing a function when a function is to be performed, which may result in unnecessary multiple touches of the touch screen.

SUMMARY OF THE INVENTION

The present invention provides a mobile terminal having a touch screen and a method of controlling a function thereof that may enable a user to control a variety of functions with ease.

Additional features of the invention will be set forth in the description which follows, and in part will be apparent from the description, or may be learned by practice of the invention.

The present invention discloses a method of controlling a function of a mobile terminal having a touch screen. The method includes displaying a function execution screen on the touch screen, displaying a control interaction guide on the function execution screen in response to a request to display the control interaction guide, the control interaction guide to guide at least one control command to be executed on the function execution screen, determining a control command corresponding to a drag if the drag is detected on the touch screen, and executing a function corresponding to the control command on the function execution screen.

The present invention also discloses a mobile terminal including a touch screen including a touch panel to detect a drag and drop generated on the function execution screen and a display unit to display a function execution screen, a control unit to control the display unit to display of a control interaction guide to guide at least one control command to be executed on the function execution screen in response to a request to display the control interaction guide, to determine a control command corresponding to a drag generated on the function execution screen, and to execute a function corresponding to the control command on the function execution screen, and a memory unit to store the control command to be executed on the function execution screen and the control interaction guide to be displayed on the function execution screen.

The present invention also discloses a method of controlling a function of a mobile terminal having a touch screen including displaying a function execution screen on the touch screen, searching for a stored control interaction guide if an approach is detected, displaying the stored control interaction guide if the stored control interaction guide exists, stopping the display of the control interaction guide if a touch on the display control interaction guide is detected, calculating drag characteristic values when a drag is detected, determining a control command corresponding to the drag characteristic values, and executing a function corresponding to the control command.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

In an exemplary embodiment of the present invention, the term "function execution screen" refers to a displayed screen of a mobile terminal when a particular function is performed. The term "control command" refers to a control command to perform a sub-function that is to be performed through the function execution screen when a particular function is performed. Such a control command may be, for example a zoom-in command or a zoom-out command when performing a camera function, or a volume control command or a playback command of a previous file or next file when performing an audio function. Herein, the control command may be a command to move to an upper-level menu or a lower-level menu or to a next menu of the same level. The control command may be performed in response to a user manipulation.

The term "control interaction guide" refers to a display image that guides control commands to be executed on a function execution screen of a mobile terminal. At this time, either none or at least one control interaction guide may be present according to a function execution screen. The control interaction guide may further include a direction image that shows a direction in which a user should move to manipulate corresponding control commands. Also, the control interaction guide may further include a symbol image that indicates corresponding control commands.

The term "touch" refers to an action in which a user contacts a touch screen using a touch device, typically a stylus or a finger. The term "drag" refers to an action in which a user moves the touch device along the touch screen. The term "drop" refers to an action in which a user releases a touch device contacting the touch screen from the touch screen.

Figure 1:
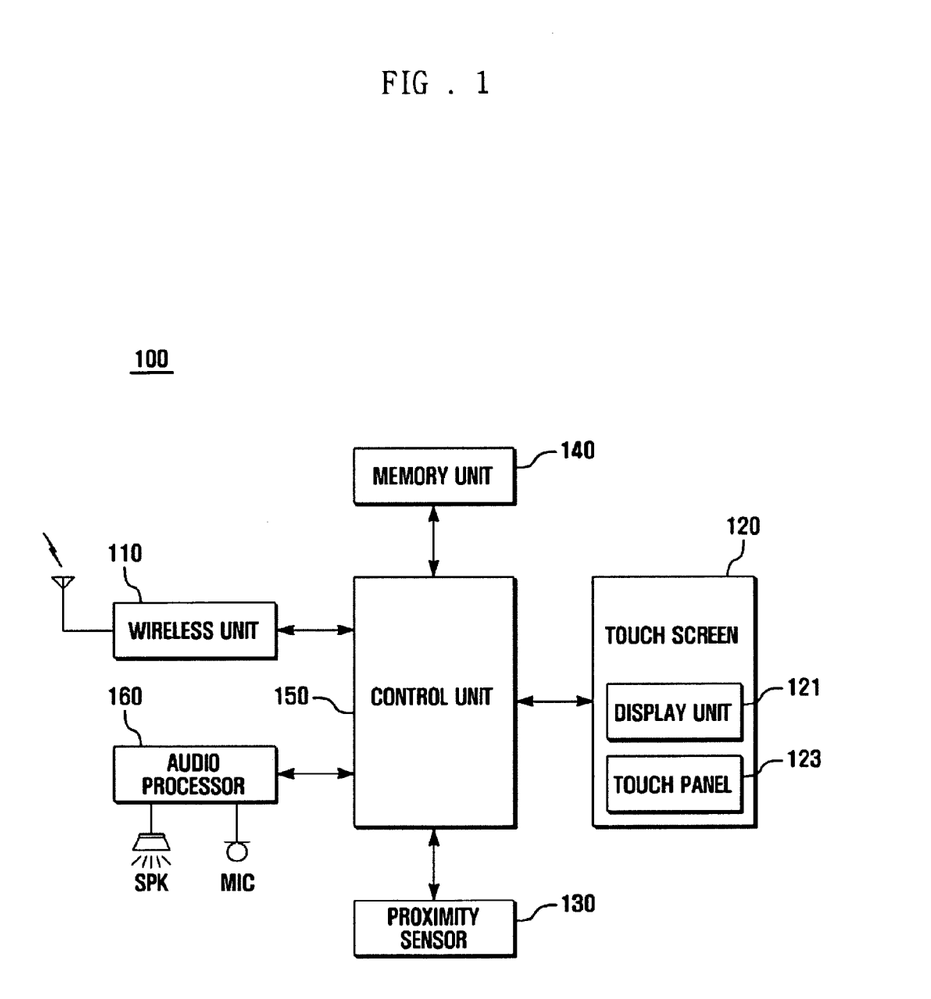
FIG. 1 shows a configuration of a mobile terminal having a touch screen to perform a function according to an exemplary embodiment of the present invention.

FIG. 1 shows a configuration of a mobile terminal 100 according to an exemplary embodiment of the present invention. For the purpose of the following description, the mobile terminal 100 is embodied as a mobile phone.

Referring to FIG. 1, the mobile terminal 100 includes a wireless unit 110, a touch screen 120, a proximity sensor 130, a memory unit 140, a control unit 150, and an audio processor 160.

The wireless communication unit 110 performs wireless communication operations for the mobile terminal 100. The wireless unit 110 includes a radio frequency (RF) transmitter to upconvert the frequency of a signal to be transmitted and amplify the signal, and an RF receiver to low-noise amplify a received signal and downconvert the frequency of the received signal.

The touch screen 120 includes a display unit 121 and a touch panel 123. The display unit 121 displays a state of the mobile terminal 100. The display unit 121 may include an LCD, and in this case includes an LCD control unit, a memory to story display data, and an LCD display element. The touch panel 123 may be mounted on or integral with the display unit 121 and may include a touch sensor and a signal converter. The touch sensor detects control commands of a touch, a drag, and a drop from a change in magnitude of a physical parameter, such as pressure or another force, or a change in magnitude of an electrical parameter, such as capacitance or resistance. The signal converter converts the change in the magnitude of the physical or electrical parameter into a touch signal.

The proximity sensor 130 detects a presence of objects near to the touch screen 120 without any physical contact. The proximity sensor 130 detects, for instance, a variation of a temperature or luminous intensity. Herein, at least one proximity sensor 130 may be installed on the rear of the display unit 121 and on a side of the display unit 121. When a single proximity sensor 130 is installed, the proximity sensor 130 may be located to detect the movement of a user's hand toward the mobile terminal.

The memory unit 140 includes a program memory section and a data memory section. The program memory section stores programs of control commands to control the mobile terminal 100 and programs to perform a function using the touch screen 123 according to an exemplary embodiment of the present invention. The data memory section stores data generated during the execution of a program of the mobile terminal 100. The memory unit 140 stores a control command to be executed on each function execution screen according to an exemplary embodiment of the present invention. Further, the memory unit 140 stores a control interaction guide for guiding a control command according to an exemplary embodiment of the present invention.

The control unit 150 controls the overall operation of the mobile terminal 100. The control unit 150 performs a signal processing function to encode and modulate a signal to be transmitted, and to demodulate and decode a received signal. The control unit 150 may include a modulator/demodulator (modem) and a coder/decoder (codec).

In particular, the control unit 150 controls display of a function execution screen when executing a function according to an exemplary embodiment of the present invention. Further, the control unit 150 controls the display unit 121 to display a control interaction guide on the function execution screen by retrieving the control interaction guide from the memory unit 140 in response to a user request to display the control interaction guide while displaying the function execution screen. Herein, the control unit 150 may recognize an approach to the touch screen 120 through a proximity sensor 130 as a request to display a control interaction guide.

The control unit 150 may remove a control interaction guide from the function execution screen if an occurrence of a touch on the touch screen 120 is detected while the control interaction guide is being displayed. Further, the control unit 120 may remove a control interaction guide from the function execution screen if a time period for displaying the guide elapses while the control interaction guide is being displayed. In addition, the control unit 150 controls the mobile phone by detecting a control command corresponding to a drag if the drag is detected on the touch screen 120.

The audio processor 160 reproduces an audio signal from an audio codec through a speaker SPK, and transmits an audio signal from a microphone MIC to the audio codec.

Figure 2:
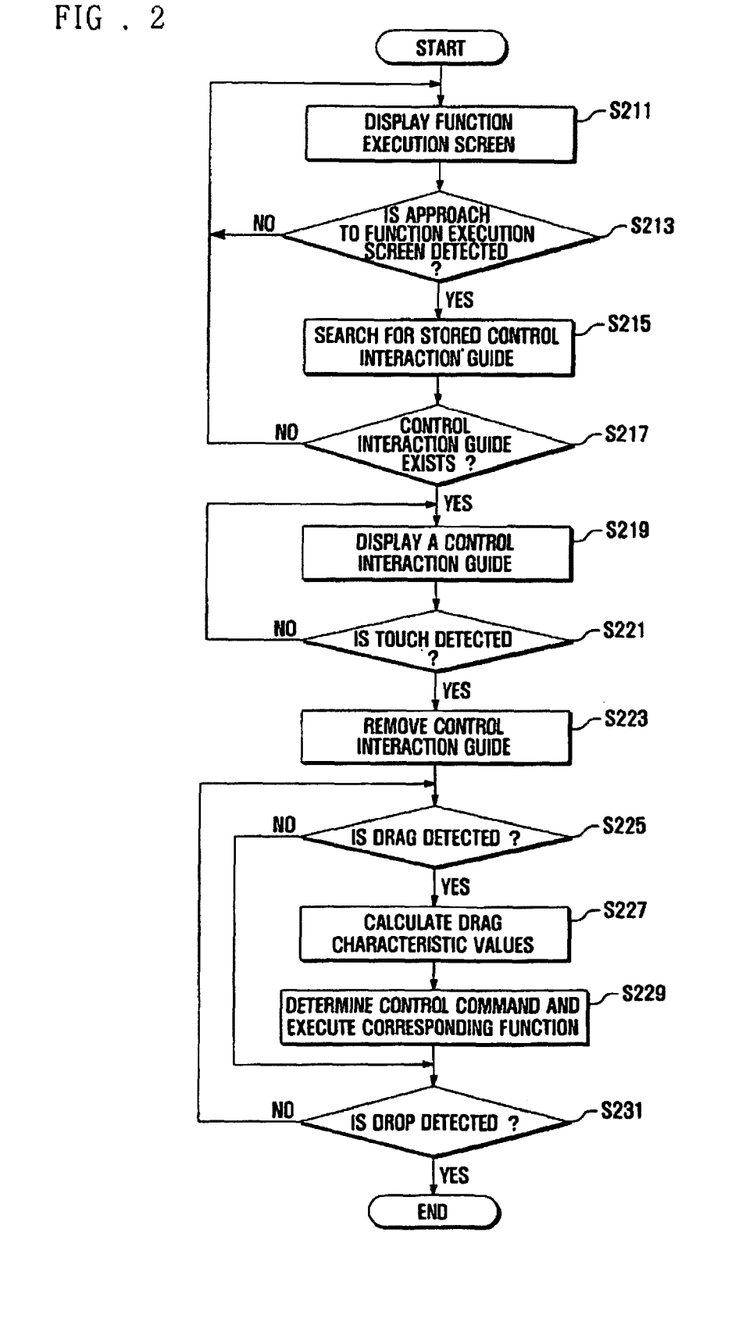
FIG. 2 is a flow chart showing a method of performing a function of a mobile terminal according to another exemplary embodiment of the present invention.
Figure 3A:
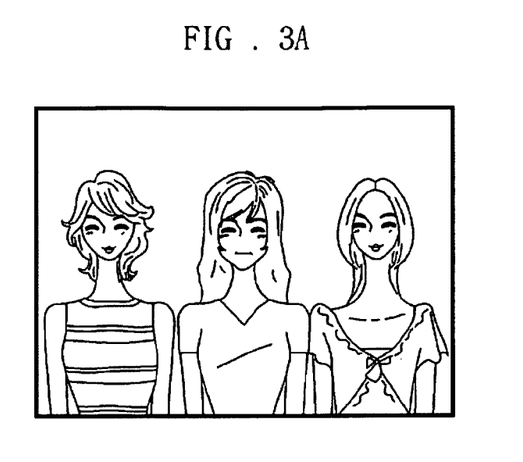
FIG. 3A, FIG. 3B, FIG. 3C, FIG. 3D, and FIG. 3E are screen representations showing the procedure of FIG. 2.
Figure 3B:
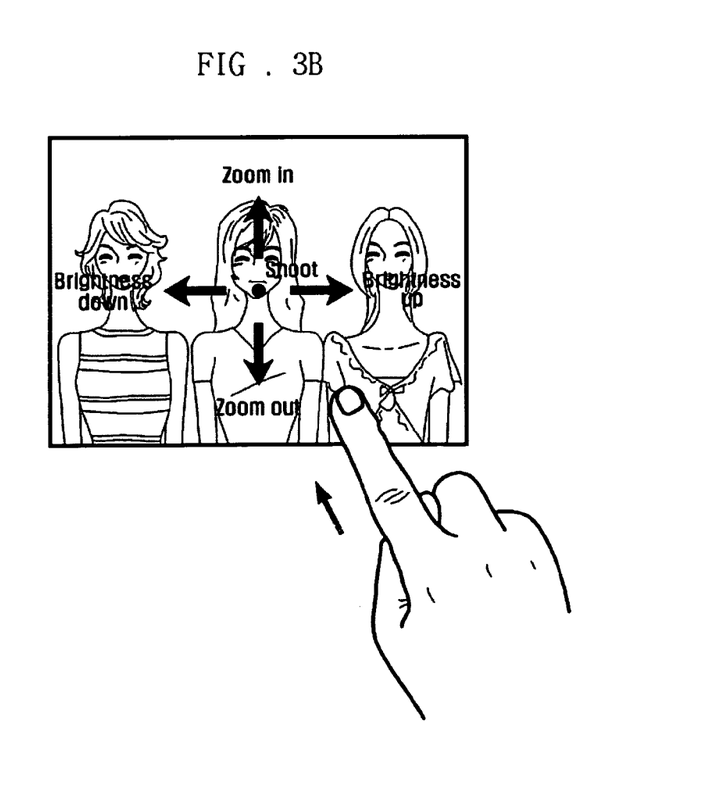
Figure 3C:
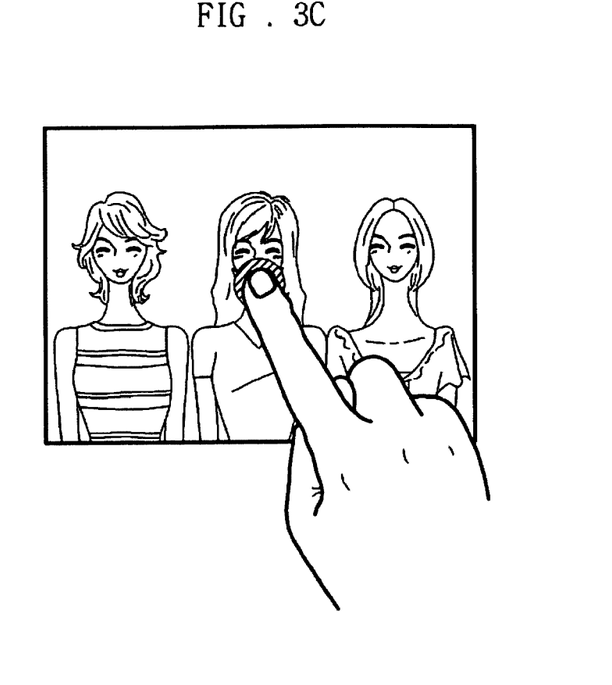
Figure 3D:
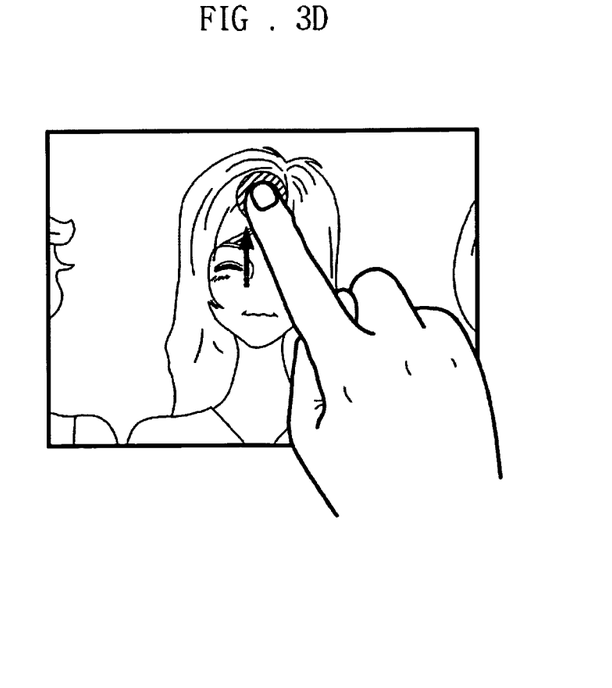
Figure 3E:
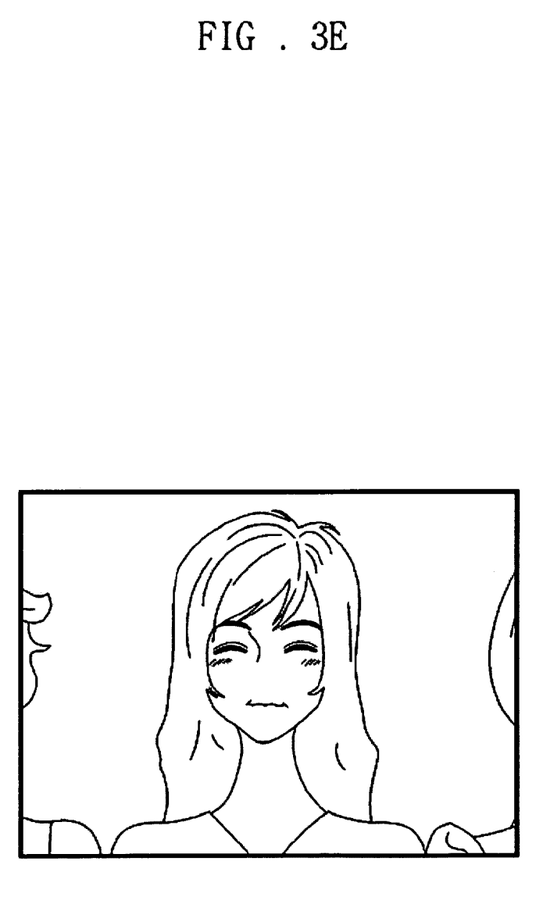

FIG. 2 is a flow chart showing a method of performing a function of a mobile terminal according to another exemplary embodiment of the present invention. FIG. 3A, FIG. 3B, FIG. 3C, FIG. 3D, and FIG. 3E are screen representations showing processes of performing a function according to the method of FIG. 2. Specifically, FIG. 3A, FIG. 3B, FIG. 3C, FIG. 3D, and FIG. 3E are screen representations when a camera function is performed. In detail, FIG. 3A shows a touch screen when a particular function is to be performed. FIG. 3B shows the touch screen when an approach to the touch screen is detected. FIG. 3C shows the touch screen when a drag is detected on the touch screen. FIG. 3D shows the touch screen when a drop is detected on the touch screen. FIG. 3E shows the touch screen after the function is performed.

Referring to FIG. 2, a function execution screen is displayed on the touch screen 120 (S211) when a function is to be performed, as shown in FIG. 3A. For example, the control unit 150 may display a function execution screen as a preview screen when performing a camera function. If the control unit 150 detects an approach to the touch screen 120 (S213), the control unit 150 searches for a control interaction guide corresponding to the displayed function execution screen stored in the memory unit 140 (S215).

The control unit 150 determines if a control interaction guide to be displayed on the function execution screen exists (S217). In other words, the control unit 150 determines if a control command to be executed on the function execution screen corresponding to a function execution screen exists. If the control unit 150 determines that a control interaction guide stored in a memory unit 140 exists, the control unit 150 displays the control interaction guide (S219), as shown in FIG. 3B. For example, the control unit 150 may display a control interaction guide to guide a control command to be performed on the preview screen such as a zoom-in command, a zoom-out command, a brightness command, or a shot command.

If the control unit 150 detects a touch on the touch screen 120 (S221), the control unit 150 removes the control interaction guide from the function execution screen (S223), as shown in FIG. 3C.

If the control unit 150 detects a drag generated on the touch screen 120 (S225), the control unit determines changes of the drag coordinates and calculates values of drag characteristics therefrom (S227). For example, the control unit 150 calculates the distance, direction, and velocity of the drag. Next, the control unit 150 determines a control command to be executed on the function execution screen corresponding to the calculated drag characteristic values and executes a function corresponding to the determined control command (S229), as shown in FIG. 3D. For example, if the distance of the drag is X pixels, and the direction of the drag is upward, the control unit enlarges the preview screen by Y times (where Y=MX, M is a constant number).

The memory unit 140 may store a control command to be executed corresponding to specific drag characteristic values in advance. The control unit 150 may further display the calculated drag characteristic values on the function execution screen (not shown).

If the control unit 150 detects a drop generated on the touch screen 120 (S231), the control unit 150 terminates the function execution procedure, as shown in FIG. 3E. When the drop is detected, the control unit 150 may further control to perform functions determining a control command to be executed on the function execution screen corresponding to the drop and a subsequent touch (not shown in FIG. 2). If a drop is not detected through the touch screen 120 at step S231, the process returns to step S225 and the control unit 150 may repeat steps S225 to S231.

If a drop is detected at step S231, the control unit 150 may further determine a control command to be executed on the function execution screen corresponding to the touch and drop (not shown in FIG. 2).

In the exemplary embodiments, a control interaction guide is displayed when an approach to a touch screen is detected while a function execution screen of a mobile terminal is being displayed. However, the present invention is not limited thereto. For example, exemplary embodiments of the present invention can be realized by displaying various interaction guides in response to approaching different positions of a touch screen while displaying a function execution screen. In addition, the present invention can be realized by detecting a request to display a control interaction guide while a function execution guide of a mobile terminal is being displayed. For example, if a touch or a drop is detected on a touch screen while a control interaction guide is being displayed on a function execution screen of a mobile terminal, the touch or drop may be regarded as a request to display a control interaction guide.

In the exemplary embodiments, a control interaction guide is removed when a touch is detected while a control interaction guide is being displayed on the function execution screen of a mobile terminal. However, the present invention is not limited thereto. Exemplary embodiments of the present invention may be realized by detecting a request to remove a control interaction guide from a function execution screen of a mobile terminal. For example, a display period to display various control interaction guides may be stored in a memory unit of a mobile terminal. If the preset display period of a control interaction guide elapses while the control interaction guide is being displayed on a function execution screen of a mobile terminal, the elapse of the preset display period may be regarded as a request to remove the control interaction guide from the function execution screen.

According to exemplary embodiments of the present invention, when executing a function of a mobile terminal, a control command to be executed on a function execution screen may be guided by displaying a control interaction guide corresponding to the control command on a function execution screen. Thereby, a user of a mobile terminal may manipulate various functions of the mobile terminal conveniently.

Figure 4:
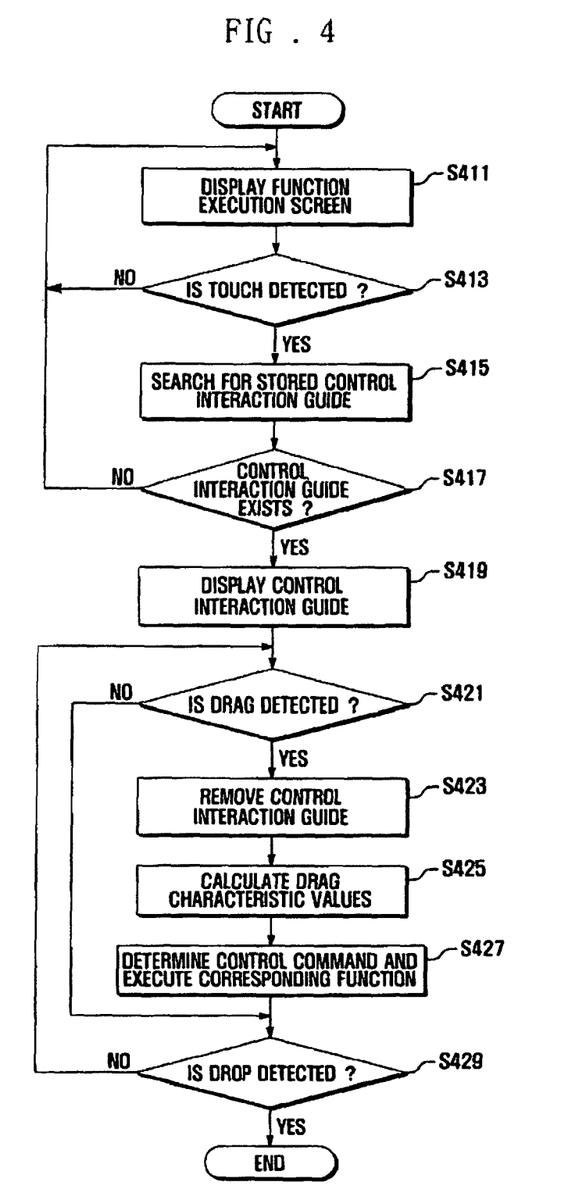
FIG. 4 is a flow chart showing a method of performing a function of a mobile terminal according to another exemplary embodiment of the present invention.

FIG. 4 is a flow chart showing a method of performing a function of a mobile terminal according to another exemplary embodiment of the present invention. In this exemplary embodiment, a detailed explanation of a configuration of a mobile terminal is omitted, as the configuration of a mobile terminal in this exemplary embodiment is similar to the configuration of a mobile terminal in the exemplary embodiment of the present invention shown in FIG. 1, except that the mobile terminal of the present exemplary embodiment may not include a proximity sensor.

Referring to FIG. 4, a function execution screen is displayed on the touch screen 120 when a function is to be performed (S411). If the control unit 150 detects a touch on the touch screen 120 (S413), the control unit 150 searches for a control interaction guide corresponding to the touch on the displayed function execution screen stored in the memory 140.

If the control unit 150 determines that a control interaction guide to be displayed on a function execution screen exists (S417), the control unit 150 displays the control interaction guide (S419).

If the control unit 150 detects a drag generated on the touch screen 120 (S421), the control unit 150 removes the control interaction guide from the function execution screen (S423). The control unit 150 determines changes of the drag coordinates and calculates values of drag characteristics therefrom (S425). For example, the control unit 150 calculates the distance, direction, and velocity of the drag. The control unit 150 then determines a control command to be executed on the function execution screen corresponding to the calculated drag characteristic values and executes a function corresponding to the determined control command (S427). Herein, a control command corresponding to specific drag characteristic values may be stored in the memory unit 140 in advance. The control unit 150 may further display the calculated drag characteristic values corresponding to the control command on the function execution screen (not shown).

If the control unit 150 detects a drop generated on the touch screen 120 (S429), the control unit 150 terminates the function execution procedure. If a drop is not detected through the touch screen 120 at step S429, the control unit 150 may repeat steps S421 to S429.

When the drop is detected, the control unit 150 may further control the mobile terminal 100 to perform functions determining a control command to be executed on the function execution screen corresponding to the drop and a subsequent touch (not shown in FIG. 4). If a drop is not detected through the touch screen 120 at step S429, the process returns to step S421 and the control unit 150 may repeat the S421 to S429.

A method of detecting a control interaction guide while a control interaction guide is being displayed on a function execution screen is described in this exemplary embodiment, but the present invention is not limited thereto. Exemplary embodiments of the present invention may be realized by displaying various interaction guides in response to approaching different positions of a touch screen while a function execution screen is being displayed.

A method of removing a control interaction guide from a function execution screen is described in this exemplary embodiment, but the present invention is not limited thereto. Exemplary embodiments of the present invention may be implemented by detecting a request to remove a control interaction guide from a function execution screen. For example, a display period to display a specific interaction guide may be stored in a memory unit of a mobile terminal. If the preset display period elapses while the specific interaction guide is being displayed, the elapse of the preset display period may be regarded as a request to remove the control interaction guide from the function execution screen.

As apparent from the above description, the present invention provides a display of a control command that may be executed by a user on a function execution screen of a mobile terminal by displaying the control interaction guide on the function execution screen. As a result, a user may easily manipulate various functions using a touch screen of a mobile terminal.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An image photographing method of an electronic device having a camera, the method comprising:
   displaying a live preview image on a touch screen of the electronic device, wherein the live preview image is obtained through the camera of the electronic device and is displayed for photographing an image;
   displaying together a plurality of graphical user interface (GUI) items over the live preview image, wherein a first GUI item of the plurality of GUI items is for adjusting a first visual characteristic of the live preview image and a second GUI item of the plurality of GUI items is for adjusting a second visual characteristic of the live preview image, wherein the first visual characteristic is different from the second visual characteristic;
   while receiving a first drag associated with the first GUI item over the live preview image, adjusting the first visual characteristic of the live preview image corresponding to the first GUI item and displaying the live preview image having the first visual characteristic adjusted according to the first drag on the touch screen;
   while receiving a second drag associated with the second GUI item over the live preview image having the first visual characteristic adjusted according to the first drag, adjusting the second visual characteristic of the live preview image corresponding to the second GUI item and displaying the live preview image having a visual characteristic adjusted according to the first and second drags on the touch screen; and
   in response to receiving a touch corresponding to a third GUI item of the plurality of GUI items, photographing an image having the visual characteristic adjusted according to the first and second drags using the camera.

2. The method of claim 1, wherein the first visual characteristic corresponding to the first GUI item of the plurality of GUI items is adjusted based on a direction of the first drag, and the second visual characteristic corresponding to the second GUI item of the plurality of GUI items is adjusted based on a direction of the second drag.

3. The method of claim 1, wherein the first visual characteristic is a zoom level of the live preview image and the second visual characteristic is a brightness of the live preview image.

4. The method of claim 3, further comprising removing the second GUI item from over the live preview image while receiving the first drag associated with the first GUI item over the live preview image.

5. The method of claim 1, wherein the plurality of GUI items are symmetrically arranged with respect to the third GUI item for photographing an image.

6. The method of claim 1, wherein the touch corresponding to the third GUI item of the plurality of GUI items is received while the plurality of GUI items is displayed over the live preview image.

7. The method of claim 1, further comprising removing the second GUI item from over the live preview image while receiving the first drag associated with the first GUI item over the live preview image.

8. The method of claim 1, wherein the plurality of GUI items are displayed together over the live preview image in response to receiving a touch over the live preview image.

9. An image photographing method of an electronic device having a camera, the method comprising:
   controlling to provide a live preview image on a touch screen of the electronic device, wherein the live preview image is obtained through the camera of the electronic device and is provided for photographing an image;
   controlling to provide together a plurality of graphical user interface (GUI) items over the live preview image, wherein a first GUI item of the plurality of GUI items is for adjusting a first visual characteristic of the live preview image and a second GUI item of the plurality of GUI items is for adjusting a second visual characteristic of the live preview image, wherein the first visual characteristic is different from the second visual characteristic;
   while a first drag associated with the first GUI item is received over the live preview image, controlling to adjust the first visual characteristic of the live preview image corresponding to the first GUI item and provide the live preview image having the first visual characteristic adjusted according to the first drag on the touch screen;

while a second drag associated with the second GUI item is received over the live preview image having the first visual characteristic adjusted according to the first drag, controlling to adjust the second visual characteristic of the live preview image corresponding to the second GUI item and provide the live preview image having a visual characteristic adjusted according to the first and second drags on the touch screen; and in response to a touch corresponding to a third GUI item of the plurality of GUI items, controlling to photograph an image having the visual characteristic adjusted according to the first and second drag using the camera.

10. The method of claim 9, wherein the first visual characteristic corresponding to the first GUI item of the plurality of GUI items is adjusted based on a direction of the first drag, and the second visual characteristic corresponding to the second GUI item of the plurality of GUI items is adjusted based on a direction of the second drag.

11. The method of claim 9, wherein the first visual characteristic is a zoom level of the live preview image and the second visual characteristic is a brightness of the live preview image.

12. The method of claim 11, further comprising controlling to remove the second GUI item from over the live preview image while the first drag associated with the first GUI item is received over the live preview image.

13. The method of claim 9, wherein the plurality of GUI items are symmetrically arranged with respect to the third GUI item for photographing an image.

14. The method of claim 9, wherein the touch corresponding to the third GUI item of the plurality of GUI items is received while the plurality of GUI items is provided over the live preview image.

15. The method of claim 9, further comprising controlling to remove the second GUI item from over the live preview image while the first drag associated with the first GUI item is received over the live preview image.

16. An electronic device having a camera comprising:
a memory storing instructions; and
a processor configured to execute the stored instructions to at least:
control to provide a live preview image on a touch screen of the electronic device, wherein the live preview image is obtained through the camera of the electronic device and is provided for photographing an image;
control to provide together a plurality of graphical user interface (GUI) items over the live preview image, wherein a first GUI item of the plurality of GUI items is for adjusting a first visual characteristic of the live preview image and a second GUI item of the plurality of GUI items is for adjusting a second visual characteristic of the live preview image, wherein the first visual characteristic is different from the second visual characteristic;
while a first drag associated with the first GUI item is received over the live preview image, control to adjust the first visual characteristic of the live preview image corresponding to the first GUI item and provide the live preview image having the first visual characteristic adjusted according to the first drag on the touch screen;
while a second drag associated with the second GUI item is received over the live preview image having the first visual characteristic adjusted according to the first drag, control to adjust the second visual characteristic of the live preview image corresponding to the second GUI item and provide the live preview image having a visual characteristic adjusted according to the first and second drag on the touch screen; and
in response to a touch corresponding to a third GUI item of the plurality of GUI items, control to photograph an image having the visual characteristic adjusted according to the first and second drag using the camera.

17. The electronic device of claim 16, wherein the first visual characteristic corresponding to the first GUI item of the plurality of GUI items is adjusted based on a direction of the first drag, and the second visual characteristic corresponding to the second GUI item of the plurality of GUI items is adjusted based on a direction of the second drag.

18. The electronic device of claim 16, wherein the first visual characteristic is a zoom level of the live preview image and the second visual characteristic is a brightness of the live preview image.

19. The electronic device of claim 18, wherein the processor is configured to execute the stored instructions further to control to remove the second GUI item from over the live preview image while the first drag associated with the first GUI item is received over the live preview image.

20. The electronic device of claim 16, wherein the plurality of GUI items are symmetrically arranged with respect to the third GUI item for photographing an image.

21. The electronic device of claim 16, wherein the touch corresponding to the third GUI item of the plurality of GUI items is received while the plurality of GUI items is provided over the live preview image.

22. The electronic device of claim 16, wherein the processor is configured to execute the stored instructions further to control to remove the second GUI item from over the live preview image while the first drag associated with the first GUI item is received over the live preview image.

23. The electronic device of claim 16, wherein the processor is configured to execute the stored instructions further to control to provide the plurality of GUI items together over the live preview image in response to a touch over the live preview image.

24. A non-transitory computer readable recording medium storing instructions executable by a processor of an electronic device having a camera to cause the processor to at least:
control to provide a live preview image on a touch screen of the electronic device, wherein the live preview image is obtained through the camera of the electronic device and is provided for photographing an image;
control to provide together a plurality of graphical user interface (GUI) items over the live preview image, wherein a first GUI item of the plurality of GUI items is for adjusting a first visual characteristic of the live preview image and a second GUI item of the plurality of GUI items is for adjusting a second visual characteristic of the live preview image, wherein the first visual characteristic is different from the second visual characteristic;
while a first drag associated with the first GUI item is received over the live preview image, control to adjust the first visual characteristic of the live preview image corresponding to the first GUI item and provide the live preview image having the first visual characteristic adjusted according to the first drag on the touch screen;

while a second drag associated with the second GUI item is received over the live preview image having the first visual characteristic adjusted according to the first drag, control to adjust the second visual characteristic of the live preview image corresponding to the second GUI item and provide the live preview image having a visual characteristic adjusted according to the first and second drag on the touch screen; and in response to a touch corresponding to a third GUI item of the plurality of GUI items, control to photograph an image having the visual characteristic adjusted according to the first and second drag using the camera.

25. The non-transitory computer readable recording medium of claim 24, wherein the first visual characteristic corresponding to the first GUI item of the plurality of GUI items is adjusted based on a direction of the first drag, and the second visual characteristic corresponding to the second GUI item of the plurality of GUI items is adjusted based on a direction of the second drag.

26. The non-transitory computer readable recording medium of claim 24, wherein the first visual characteristic is a zoom level of the live preview image and the second visual characteristic is a brightness of the live preview image.

27. The non-transitory computer readable recording medium of claim 26, wherein the stored instructions executable by the processor of the electronic device having the camera cause the processor further to control to remove the second GUI item from over the live preview image while the first drag associated with the first GUI item is received over the live preview image.

28. The non-transitory computer readable recording medium of claim 24, wherein the plurality of GUI items are symmetrically arranged with respect to the third GUI item for photographing an image.

29. The non-transitory computer readable recording medium of claim 24, wherein the touch corresponding to the third GUI item of the plurality of GUI items is received while the plurality of GUI items is provided over the live preview image.

30. The non-transitory computer readable recording medium of claim 24, wherein the stored instructions executable by the processor of the electronic device having the camera cause the processor further to control to remove the second GUI item from over the live preview image while the first drag associated with the first GUI item is received over the live preview image.

* * * * *